(12) United States Patent
Takimoto et al.

(10) Patent No.: US 11,767,397 B2
(45) Date of Patent: Sep. 26, 2023

(54) THERMALLY CONDUCTIVE RESIN COMPOSITION

(71) Applicant: TOYOBO CO., LTD., Osaka (JP)

(72) Inventors: Gota Takimoto, Shiga (JP); Michihiko Irie, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 388 days.

(21) Appl. No.: 17/052,264

(22) PCT Filed: Oct. 7, 2019

(86) PCT No.: PCT/JP2019/039445
§ 371 (c)(1),
(2) Date: Nov. 2, 2020

(87) PCT Pub. No.: WO2020/080158
PCT Pub. Date: Apr. 23, 2020

(65) Prior Publication Data
US 2021/0087329 A1    Mar. 25, 2021

(30) Foreign Application Priority Data

Oct. 17, 2018 (JP) ................................. 2018-195527

(51) Int. Cl.
| | | |
|---|---|---|
| *C08G 59/50* | (2006.01) | |
| *C09J 163/00* | (2006.01) | |
| *C08L 63/00* | (2006.01) | |
| *C08K 3/01* | (2018.01) | |
| *C08K 7/18* | (2006.01) | |
| *C08G 59/24* | (2006.01) | |
| *C08G 59/32* | (2006.01) | |
| *C08G 59/40* | (2006.01) | |
| *C08K 3/22* | (2006.01) | |
| *C08K 3/38* | (2006.01) | |
| *C08K 5/353* | (2006.01) | |
| *B32B 27/38* | (2006.01) | |

(52) U.S. Cl.
CPC ....... *C08G 59/245* (2013.01); *C08G 59/3227* (2013.01); *C08G 59/4021* (2013.01); *C08K 3/22* (2013.01); *C08K 3/38* (2013.01); *C08K 5/353* (2013.01); *C08K 7/18* (2013.01); *C09J 163/00* (2013.01); *C08K 2003/2227* (2013.01); *C08K 2003/385* (2013.01); *C09J 2203/326* (2013.01)

(58) Field of Classification Search
None
See application file for complete search history.

(56) References Cited

U.S. PATENT DOCUMENTS

| | | | | |
|---|---|---|---|---|
| 4,180,607 | A  * | 12/1979 | Sasaki ................ | C08G 59/4223 528/115 |
| 2005/0119075 | A1 * | 6/2005 | Ashino .................. | A63B 49/10 473/535 |
| 2007/0293588 | A1 | 12/2007 | Yoshida et al. | |
| 2009/0253887 | A1 | 10/2009 | Mori | |
| 2015/0137362 | A1 * | 5/2015 | Lau ..................... | H01L 23/3142 257/738 |

FOREIGN PATENT DOCUMENTS

| | | | |
|---|---|---|---|
| JP | 2-110125 | 4/1990 | |
| JP | 11-323162 | 11/1999 | |
| JP | 2005-179404 | 7/2005 | |
| JP | 2006-213764 | 8/2006 | |
| JP | 2010196016 A * | 9/2010 | ............ C08G 59/20 |
| JP | 2011-153268 | 8/2011 | |
| JP | 2011-225798 | 11/2011 | |
| JP | 2015-174906 | 10/2015 | |
| JP | 2017-206651 | 11/2017 | |
| JP | 2018-48260 | 3/2018 | |
| WO | 2007/111136 | 10/2007 | |

OTHER PUBLICATIONS

Machine Translation of JP-2010196016-A (no date).*
International Search Report (ISR) dated Dec. 17, 2019 in International (PCT) Application No. PCT/JP2019/039445.

* cited by examiner

*Primary Examiner* — Michael J Feely
(74) *Attorney, Agent, or Firm* — Wenderoth, Lind & Ponack, L.L.P.

(57) ABSTRACT

The present invention aims to provide a resin composition which can form a cured product having a high adhesive property and a high thermal conductivity. A resin composition containing an epoxy compound (A), an amine curing agent (B) and a thermally conductive filler (C), wherein the epoxy compound (A) is in a liquid form and wherein the amine curing agent (B) contains a benzoxazole skeleton.

11 Claims, No Drawings

THERMALLY CONDUCTIVE RESIN COMPOSITION

TECHNICAL FIELD OF THE INVENTION

The present invention relates to a resin composition having an excellent thermal conductivity and also to a thermally conductive cured product and an electronic part using the same.

BACKGROUND ART

In recent years, electronic parts have been made into small sizes and arranged in a high density whereby their heat generation density per unit volume has been increasing. Therefore, there is a demand for enhancing a thermal conductivity of a thermally conductive adhesive which is used for adhering the constituting parts. As to a method for enhancing the thermal conductivity of the thermally conductive adhesive, there is exemplified a method wherein a filler having a high thermal conductivity is compounded. For example, in Patent Document 1, the adhesive is compounded with a high thermally conductive filler having a controlled particle size and shape whereby the thermal conductivity of the cured product is enhanced.

However, when a monomer of an epoxy compound is compounded with a large amount of the thermally conductive filler for enhancing the thermal conductivity, viscosity of a resulting resin composition significantly increases, which results in deterioration of workability and decrease in adhesive force.

Thus, there is a limit for enhancing the thermal conductivity by increasing the compounding amount of the thermally conductive filler. Accordingly, there has been a demand for enhancing the thermal conductivity of the cured product by means of enhancement of the thermal conductivity of the epoxy resin itself which acts as a matrix.

For example, in Patent Document 2, there is mentioned a method for enhancing the thermal conductivity by using an epoxy resin of a bisphenol type and by using an epoxy resin containing various mesogen skeletons.

PRIOR ART DOCUMENTS

Patent Documents

Patent Document 1: Japanese Patent Application Laid-Open (JP-A) No. 2015-174906
Patent Document 2: Japanese Patent Application Laid-Open (JP-A) No. 323162/99

DISCLOSURE OF THE INVENTION

Problem that the Invention is to Solve

However, according to the method mentioned in Patent Document 2, a viscosity of the epoxy resin composition itself in a monomer state increases. Therefore, it was necessary to add a solvent when the thermally conductive filler is added to the adhesive so as to lower the viscosity. As a result, handling as the adhesive is deteriorated. In addition, the thermal conductivity and adhesive force of the cured product are not in sufficient levels as well whereby further enhancement has been demanded.

The present invention has been achieved in view of the problems in the prior art. The object of the present invention is to provide a resin composition for forming an adhesive layer being excellent in the thermal conductivity and also to provide a thermally conductive cured product and an electronic part using the same.

Means for Solving the Problem

As a result of extensive investigations, the present inventors have found that the above problems can be solved by the following means, and achieved the present invention. Thus, the present invention comprises the following constitutions.

A resin composition containing an epoxy compound (A), an amine curing agent (B) and a thermally conductive filler (C), wherein the epoxy compound (A) is in a liquid form and wherein the amine curing agent (B) contains a benzoxazole skeleton.

Preferably, a viscosity of the composition measured at 25° C. and 5 rpm is from 10 Pa·s to 300 Pa·s.

Preferably, the thermally conductive filler (C) is at least one kind of a substance selected from a group consisting of alumina, magnesium oxide, zinc oxide, boron nitride, aluminum nitride, silicon nitride, barium titanate, silicon carbide, carbon, diamond, silver, gold, copper, nickel and aluminum. Preferably, the thermally conductive filler (C) is spherical. Preferably, a content of the thermally conductive filler (C) is from 40% by volume to 75% by volume in relation to the whole volume of the resin composition.

Preferably, the amine curing agent (B) is 5-amino-2-(p-aminophenyl)benzoxazole.

Preferably, the resin composition contains, as the epoxy compound (A), 10% by weight or more of an epoxy compound having three or more functionalities in relation to the whole weight of the epoxy compound (A).

Preferably, a ratio by mass of the epoxy compound (A) to the amine curing agent (B) is from 90/10 to 60/40 in terms of (A)/(B). Preferably, the resin composition does not contain any compound having a boiling point of 200° C. or lower.

A thermally conductive adhesive or an electronic part which is characterized in containing the above-mentioned resin composition.

Effects of the Invention

The resin composition of the present invention can form a cured product having a high thermal conductivity while the adhesive property is still maintained. In addition, an electronic part using the resin composition of the present invention also has an excellent thermal conductivity.

BEST MODE FOR CARRYING OUT THE INVENTION

<Epoxy Compound (A)>
It is necessary that the epoxy compound (A) used in the present invention is in a liquid form at room temperature (25° C.). The compound is preferred to be in a liquid form even at 10° C. or lower, and more preferred to be in a liquid form even at 0° C. or lower. As a result that the epoxy compound (A) is in a liquid form, the thermal conductivity of the resin composition can be enhanced. The lower limit of the temperature at which the compound is in a liquid form is not particularly limited and, in an industrial view, −20° C. or higher is sufficient.

There is no particular limitation for the epoxy compound (A) provided that it is in a liquid form at room temperature (25° C.). Examples thereof are bisphenol-type epoxy compounds prepared by glycidylating bisphenol such as bisphenol A, bisphenol F, bisphenol AD, bisphenol S, tetramethylbisphenol A, tetramethylbisphenol F, tetramethylbisphenol AD, tetramethylbisphenol S, terebromobisphenol A, tetrachlorobisphenol A and tetrafluorobisphenol A; epoxy compounds prepared by glycidylating divalent phenol such as biphenol, dihydroxynaphthelene and 9,9-bis(4-hydroxyphenyl)fluorene; epoxy compounds prepared by glycidylating trisphenol such as 1,1,1-tris(4-hydroxyphenyl)methane and 4,4-(1-(4-(1-(4-hydroxyphenyl)-1-methylethyl)phenyl)-ethylidene)bisphenol; epoxy compounds prepared by glycidylating tetrakisphenol such as 1,1,2,2-tetrakis(4-hydroxyphenyl)-ethane; novolak-type epoxy compounds prepared by glycidylating novolak such as phenol novolak, cresol novolak, bisphenol A novolak, brominated phenol novolak and brominated bisphenol A novolak; epoxy compounds prepared by glycidylating polyhydric phenol such as catechol, resorcinol, hydroquinone and benzenetriol; aliphatic ether-type epoxy compounds prepared by glycidylating polyhydric alcohol such as glycerol and polyethylene glycol; ether-ester-type epoxy compounds prepared by glycidylating hydroxy carboxylic acid such as p-oxybenzoic acid and β-oxynaphthoic acid; ester-type epoxy compounds prepared by glycidylating polycarboxylic acid such as phthalic acid and terephthalic acid; glycidylated compounds of an amine compound such as 4,4-diaminodiphenylmethane, m-xylylenediamine and aminophenol; glycidyl-type epoxy compounds of amine-type epoxy compound such as triglycidyl isocyanurate; and alicyclic epoxides such as 3,4-epoxycyclohexylmethyl-3',4'-epoxycyclohexane carboxylate. Each of them may be used solely or two or more of them may be used jointly. Among them, preferred ones are epoxy compounds prepared by glycidylating bisphenol A, epoxy compounds prepared by glycidylating bisphenol F, epoxy compounds of aminophenol type, epoxy compounds of m-xylylenediamine type or epoxy compounds of phenol novolak type, in view of excellent adhesive property and heat resistance property of the cured products.

Although the viscosity of the epoxy compound (A) is not particularly limited, it is preferred to be within a range of from 0.1 Pa·s to 20 Pa·s, more preferred to be within a range of from 0.5 Pa·s to 15 Pa·s, and further preferred to be within a range of from 1 Pa·s to 10 Pa·s. When the viscosity of the epoxy compound (A) is less than 0.1 Pa·s, the epoxy resin may be bled out before the resin composition is cured while, when it is more than 20 Pa·s, the viscosity of the epoxy compound may become too high and the handling may become difficult.

When the whole epoxy compound (A) is taken as 100% by mass, it is preferred that a multifunctional epoxy compound having three or more functionalities (having three or more epoxy groups) in a molecule is contained therein in an amount of 10% by mass or more. More preferably, the content is in an amount of 20% by mass or more, and further preferably, the content is in an amount of 30% by mass or more. When the content of the multifunctional epoxy compound having three or more functionalities is 10% by mass or more, a crosslinking density is enhanced whereby the thermal conductivity can be more enhanced. As to the multifunctional epoxy compound having three or more functionalities, an epoxy compound of an m-xylylenediamine type or an epoxy compound of an aminophenol type is preferred. The multifunctional epoxy compound as such may be used solely or two or more thereof may be used jointly.

<Amine Curing Agent (B)>

It is necessary that the amine curing agent (B) used in the present invention contains a benzoxazole skeleton. The amine curing agent (B) reacts with an epoxy compound which is in a liquid form at room temperature to form a cured product of the epoxy resin. Due to the fact that the amine curing agent (B) is a curing agent having a benzoxazole skeleton, the benzoxazole skeleton is introduced into the cured product of the epoxy resin whereby the thermal conductivity of the epoxy resin which acts as a matrix is significantly enhanced. Therefore, the thermal conductivity of the cured product of a resin composition is enhanced.

As to the amine curing agent (B), there are exemplified 5-amino-2-(p-aminophenyl)benzoxazole, 6-amino-2-(p-amino-phenyl)benzoxazole, 5-amino-2-(m-aminophenyl)benzoxazole, 6-amino-2-(m-aminophenyl)benzoxazole, 2,2'-p-phenylene-bis(5-aminobenzoxazole), 2,2'-p-phenylenebis(6-aminobenzoxazole), 1-(5-aminobenzoxazolo)-4-(6-aminobenzoxazolo) benzene, 2,6-(4,4'-diaminodiphenyl)benzo[1,2-d:5,4-d']bisoxazole, 2,6-(4,4'-diaminodiphenyl)benzo[1,2-d:4,5-d']bisoxazole, 2,6-(3,4'-diaminodiphenyl)benzo[1,2-d:5,4-d']bisoxazole, 2,6-(3,4'-diaminodiphenyl)benzo[1,2-d:4,5-d']bisoxazole, 2,6-(3,3'-diaminodiphenyl)benzo[1,2-d:5,4-d']bisoxazole and 2,6-(3,3'-diaminodiphenyl)benzo[1,2-d:4,5-d']bisoxazole. Each of them may be used solely or two or more of them may be used jointly. Among them, 5-amino-2-(p-aminophenyl)benzoxazole or 6-amino-2-(m-aminophenyl)-benzoxazole is preferred in view of the thermal conductivity of the cured product or the easiness in manufacturing the amine curing agent (B) itself. Further, as to the amine curing agent (B), it is also possible to use an amine adduct compound wherein epoxy or the like is added thereto.

The shape of the amine curing agent (B) is not particularly limited but any of rectangular, polyhedral, cubic, elliptic, spherical, needlelike, plate-like, string-like and flaky shapes may be used. Preferable shape is needlelike or rectangular shape. When the amine curing agent (B) having the above preferable shape reacts with the epoxy compound (A) in a liquid form to form a cured product of the epoxy resin, the amine curing agent (B) is firstly filled along particles of the thermally conductive filler (C). At the time of a curing reaction thereafter, the epoxy resin (A) is aligned into along diameter direction and is cured/grown whereby a thermally conductive path is formed among the thermally conductive fillers (C). It is presumed that, as a result, the thermal conductivity of the cured product as a whole is enhanced.

An aspect ratio (a ratio of a long diameter to a short diameter in the amine curing agent (B)) of the amine curing agent (B) is preferred to be 1.3 or more, more preferred to be 1.5 or more, further preferred to be 1.7 or more, and especially preferred to be 2 or more. When the aspect ratio is 1.3 or more, the thermal conductivity of the cured product of the resin composition can be enhanced. Although the upper limit of the aspect ratio is not particularly limited, it is preferred to be 20 or less, more preferred to be 18 or less, further preferred to be less than 4, and especially preferred to be 3 or less.

The aspect ratio (a ratio of a long diameter to a short diameter in the amine curing agent (B)) of the amine curing agent (B) is preferred to be 1.3 or more, more preferred to be 1.5 or more, further preferred to be 1.7 or more, and especially preferred to be 1.8 or more, in view of a storage stability. Although the upper limit of the aspect ratio is not particularly limited, it is preferred to be 15 or less, more preferred to be less than 4, further preferred to be 3 or less, and especially preferred to be 2 or less. When the aspect ratio is less than 4 and the thermally conductive filler (C) is spherical, a compatibility with the thermally conductive filler (C) becomes particularly good and the viscosity can be kept in a level necessary for achieving a good workability. As a result, an excellent storage stability tends to be achieved.

The long diameter of the amine curing agent (B) is preferred to be within a range of from 50 μm to 1000 μm, more preferred to be within a range of from 100 μm to 800 μm, and further preferred to be within a range of from 200 μm to 600 μm. When the long diameter is less than 50 μm, the above-mentioned effect of enhancing the thermal conductivity may not be sufficient while, when the long diameter is more than 1000 μm, the amine curing agent (B) may be aligned to a surface direction in a coating film and the thermal conductivity in a thickness direction of the cured product may become insufficient.

A melting point of the amine curing agent (B) is preferred to be from 60° C. to 400° C., more preferred to be from 80° C. to 380° C., and further preferred to be from 100° C. to 350° C. When the melting point is too low, the amine curing agent is apt to elute whereby the storage stability may be deteriorated while, when the melting point is too high, a high temperature and a long time may be required for the curing whereby operability may become bad.

In the present invention, there may be jointly used a commonly-used curing agent other than the amine curing agent (B) containing a benzoxazole skeleton within such an extent that it does not deteriorate the effect of the present invention. As to the curing agent as such, there are exemplified a curing agent of amine type, a curing agent of acid anhydride type and a curing agent of phenol type. To be more specific, as to the curing agent of amine type, there are exemplified aliphatic diamines, aliphatic polyamines, aliphatic polyamines containing an aromatic ring, alicyclic or cyclic polyamines and aromatic primary amines. As to the curing agent of acid anhydride type, there are exemplified aliphatic acid anhydrides, alicyclic acid anhydrides, aromatic acid anhydrides and acid anhydrides of halogen type. As to the curing agent of phenol type, there are exemplified trisphenol, phenol novolak and cresol novolak. The amount of the curing agent as such is preferred to be 50% by mass or less, more preferred to be 30% by mass or less, further preferred to be 10% by mass or less, and especially preferred to be 1% by mass or less, when the whole mass of the resin composition is taken as 100% by mass. When the amount of the curing agent as such is too much, the content of the amine curing agent having a benzoxazole skeleton to the whole resin composition may relatively lower and the thermal conductivity of the resin composition may worsen.

As to a mixing ratio of the epoxy compound (A) to the amine curing agent (B), it is usually preferred, in view of a curing property of the resin composition, to be within a range of 0.2 to 1.2 equivalent (s) in terms of an amine equivalent of the amine curing agent (B) to 1 equivalent of epoxy group in the epoxy compound (A) (amine equivalent/ epoxy equivalent). The mixing ratio is more preferred to be 0.4 equivalent or more and further preferred to be 0.6 equivalent or more. An upper limit of the mixing ratio is preferred to be 1.0 equivalent or less and more preferred to be 0.8 equivalent or less.

A ratio by mass of the epoxy compound (A) to the amine curing agent (B) in terms of (A)/(B) is preferred to be from 90/10 to 60/40, more preferred to be from 85/15 to 65/35, and further preferred to be from 80/20 to 70/30. When the ratio by mass is within the above range, the cured product of the resin composition can express an excellent thermal conductivity.

<Thermally Conductive Filler (C)>

As to the thermally conductive filler (C), there is no limitation provided that it is a filler having a thermal conductivity. For example, a conductive inorganic filler such as alumina, magnesium oxide, zinc oxide, boron nitride, aluminum nitride, silicon nitride, barium titanate, silicon carbide, carbon, diamond, silver, gold, copper, nickel and aluminum may be used solely or two or more thereof may be used jointly. It is particularly preferred to use an electrically insulating inorganic filler. When the electrically insulating inorganic filler is used, it is possible to achieve both of a promotion of heat dissipation and an prevention of short circuit between the parts in the case of using the adhesive, for example, in an internal space of an electronic instrument. Specific examples of the electrically insulating inorganic filler are aluminum nitride, alumina, barium titanate, boron nitride, silicon carbide and zinc oxide. Among them, aluminum nitride, boron nitride, or alumina is particularly preferred.

As to a shape of the thermally conductive filler (C), any of regular and irregular shapes may be used. As to the shapes as such, there are exemplified polyhedral, cubic, elliptic, spherical, needlelike, plate-like and flaky shapes as well as a mixture and an aggregate thereof. Among them, the spherical shape is preferred. By using a thermally conductive filler (C) in the spherical shape, a viscosity of the resin composition becomes low and a handling of the resin composition becomes good. An aspect ratio of the thermally conductive filler (C) is preferred to be 1.5 or less, more preferred to be 1.3 or less, and further preferred to be 1.1 or less.

Although an average particle size of the thermally conductive filler (C) is not particularly limited, it is preferred to be from 1 μm to 100 μm, more preferred to be from 2 μm to 80 μm, further preferred to be from 3 μm to 60 μm, and especially preferred to be from 5 μm to 50 μm. When the average particle size is less than 1 μm, the viscosity of the resin composition may become high whereby the workability may become bad or the thermal conductivity may become bad. When the average particle size is more than 100 μm, the minimum thickness of the coating film prepared from the resin composition may increase whereby the thermal resistance of the coating film may become bad.

As to an adding amount of a thermally conductive filler (C), it is preferred to be from 40% by volume to 75% by volume, more preferred to be from 45% by volume to 70% by volume, and further preferred to be from 55% by volume to 65% by volume, to the total volume of the resin composition. When the adding amount of a thermally conductive filler (C) is less than 40% by volume, a filling amount of the thermally conductive filler (C) is small whereby the thermal conductivity of a filler is not achieved and there is a risk that the thermal conductivity of a cured product significantly lowers while, when it is more than 75% by volume, viscosity of a resin composition is too high whereby there is a risk that workability becomes bad or adhesive force becomes bad.

<Resin Composition>

The resin composition of the present invention contains the epoxy compound (A), the amine curing agent (B) and the thermally conductive filler (C), wherein the epoxy compound (A) is in a liquid form and wherein the amine curing agent (B) contains a benzoxazole skeleton.

A viscosity of the resin composition is preferred to be from 10 Pa·s to 300 Pa·s, more preferred to be from 15 Pa·s to 200 Pa·s, and further preferred to be from 20 Pa·s to 100 Pa·s. When the viscosity of the resin composition is less than 10 Pa·s, a workability during application of the resin composition may worsen and a bleeding out may happen while, when the viscosity of the resin composition is more than 300 Pa·s, a handling may become difficult and the cured product cannot be uniformly produced whereby the thermal conductivity may worsen.

In the present invention, an epoxide-reactive diluent may be added upon necessity within such an extent that the thermal conductivity, reactivity, heat resistance, toughness, storage stability, etc. are not lowered thereby. Examples of the reactive diluent are phenyl glycidyl ether, butyl glycidyl ether, alkyl glycidyl ether, alkyl diglycidyl ether, alkylene glycol glycidyl ether, alkylene glycol diglycidyl ether, styrene oxide, octylene oxide and a mixture thereof. A content of the reactive diluent is preferred to be 50% by mass or less, more preferred to be 20% by mass or less, and further preferred to be 5% by mass or less, when the whole mass of the resin composition is taken as 100% by mass.

In the present invention, an organic solvent which can be evaporated at a temperature lower than a curing temperature may be added in order to adjust the viscosity of the resin composition. As to the organic solvent, that having a boiling point of 200° C. or lower is preferred. To be more specific, there are exemplified methanol, ethanol, propanol, butanol, toluene, xylene, Solvesso (registered trademark), Isopar (registered trademark), ethyl acetate, butyl acetate, methyl ethyl ketone, cyclohexanone, cyclohexanol, isophorone, methyl cellosolve, ethyl cellosolve, butyl cellosolve, butyl cellosolve acetate, ethyl carbitol, ethyl carbitol acetate, ethylene glycol monoacetate, dimethylformamide, γ-butyrolactone and n-methylpyrrolidone. It is preferred that the resin composition does not contain any organic solvent because the organic solvent has a risk of worsening of adhesive property or thermal conductivity of the cured product due to formation of voids after evaporation of the organic solvent, or has a risk of affection of working environment due to evaporation of the organic solvent. A content of the organic solvent is preferred to be 50% by mass or less, more preferred to be 20% by mass or less, further preferred to be 5% by mass or less, and may be even 0% by mass, when the whole mass of the resin composition is taken as 100% by mass.

Besides the above, it is also possible upon necessity to use an additive such as a silane coupling agent, a titanate coupling agent, an antioxidant (such as that of hindered phenol type or phosphorus type), a releasing agent (such as higher fatty acid or wax), a flame retardant (such as halogen, phosphorus compound or the like), an antifoaming agent and a coloring agent.

When the resin composition of the present invention is heated, the amine curing agent having a benzoxazole skeleton reacts with the epoxy compound to form an adhered layer consisting of the cured product of the epoxy resin. A heating temperature is usually within a range of from 80° C. to 250° C., preferably within a range of from 100° C. to 200° C., and more preferably within a range of from 120° C. to 160° C., although it depends upon the type of the epoxy compound (A) and the amine curing agent (B) used. A reaction (curing) time may also be set appropriately. It is usually from 0.1 to 6 hour(s), preferably from 0.5 to 5 hour(s), and more preferably from 1 to 3 hour(s).

EXAMPLES

As hereunder, the resin composition of the present invention will be more specifically illustrated by referring to Examples although the present invention is not limited to those Examples. A term "part(s)" in Examples and Comparative Examples (text) stand(s) for part(s) by mass.

Example 1

An epoxy compound 1 (13 parts by mass), 3 parts by mass of an epoxy compound 2, 5 parts by mass of an amine 1 and 100 parts by mass of an thermally conductive filler 1 were placed in a flask, and well stirred and mixed to prepare a resin composition 1. The thermal conductivity of the obtained resin composition 1 was measured. The result is shown in Table 1.

Examples 2 to 11 and Comparative Examples 1 to 3

Each of the ingredients was compounded in apart (or parts) by mass according to the formulation as shown in Table 1 and Table 2, and well stirred and mixed in the same manner as in Example 1 to prepare resin compositions 2 to 14. The thermal conductivity of each of the obtained resin compositions 2 to 14 was measured. The results are shown in Tables 1 and 2.

<Preparation of a Thermally Cured Product>

Each of the resin compositions prepared in Examples and Comparative Examples was placed in a mold set at 150° C. and subjected to a heat press molding at 150° C. for 2 hours to give a test piece of a thermally cured product.

<Measurement of Thermal Conductivity>

With regard to the test piece of the thermally cured product of the resin composition prepared in each of Examples and Comparative Examples, thermal diffusivity, specific heat and density thereof at 25° C. were measured. The thermal conductivity was calculated according to the following formula.

$$\text{thermal conductivity } \lambda \text{ (W/mK)} = \alpha \cdot Cp \cdot d \quad \text{(Formula)}:$$

α: thermal diffusivity ($m^2$/s), Cp: specific heat (J/(kg·K), d: density (kg/$m^3$)

The thermal diffusivity α was measured by a xenon flash method using a xenon flash analyzer LFA 467 Hyperflash manufactured by NETZSCH. The density d was measured by an Archimedes method. The specific heat Cp was measured by a DSC method using DSC 7020 manufactured by Hitachi High-Tech Science.

<Measurement of Viscosity>

The viscosity was measured for 0.4 ml of the resin composition prepared in each of Examples and Comparative Examples by using a viscometer TV-25 of E type manufactured by Toki Sangyo, with a cone rotor 3°×R12. The temperature was controlled by a constant-temperature water of 25° C. The viscosity value at a rotation rate of 5 rpm was adopted as a measured value.

<Measurement of Adhesive Strength>

The shear adhesive strength was measured according to JIS K6850 (1990). To be more specific, the resin composition was applied to one side (12.5 mm) of an aluminum piece in 25 mm×100 mm×1.6 mm, and another sheet of an aluminum piece in the same type was laminated thereon. After that, the laminate was cured by heating at 150° C. for 2 hours to prepare a test piece (aluminum piece/resin composition/aluminum piece). This test piece was stretched in parallel to the adhered surface in a tensile rate of 10 mm/min. The maximum load upon breakage was divided by the adhered area to determine the adhesive strength.

TABLE 1

| Resin composition | | | Example 1 | Example 2 | Example 3 | Example 4 | Example 5 | Example 6 | Example 7 |
|---|---|---|---|---|---|---|---|---|---|
| Compounding amount (parts(s) by mass) | epoxy compound (A) | epoxy compound 1 | 13 | 13 | | | 18 | 8 | |
| | | epoxy compound 2 | 3 | | 2 | 8 | | | 17 |
| | | epoxy compound 3 | | 2 | | | | 12 | |
| | | epoxy compound 4 | | | 10 | | | | |
| | | epoxy compound 5 | | | | 2 | | 6 | |
| | amine curing agent (B) | amine 1 | 5 | 5 | 5 | 5 | 5 | 8 | |
| | | amine 2 | | | | | | | 5 |
| | | amine 3 | | | | | | | |
| | | amine 4 | | | | | | | |
| | | amine 5 | | | | | | | |
| | thermally conductive filler (C) | filler 1 | 100 | 100 | 100 | 100 | | | |
| | | filler 2 | | | | | 100 | 90 | |
| | | filler 3 | | | | | | | 90 |
| | | filler 4 | | | | | | | 10 |
| | | filler 5 | | | | | | 10 | |
| Volume filling rate of thermally conductive filler (C) | | (% by volume) | 61 | 62 | 66 | 69 | 59 | 49 | 60 |
| Content of multifunctional epoxy compound in epoxy compound (A) | | (% by mass) | 19 | 13 | 17 | 84 | 0 | 46 | 100 |
| Viscosity | | (Pa·s) | 72 | 63 | 33 | 240 | 113 | 160 | 37 |
| Thermal conductivity | | (W/mK) | 6.7 | 6.5 | 6.4 | 7.1 | 5.3 | 6.9 | 6.6 |
| Adhesive strength | | (MPa) | 7.9 | 7.7 | 7.3 | 6.6 | 8.1 | 7.1 | 8.0 | epoxy compound 1: jER828 (epoxy resin of a bisphenol A type, manufactured by Mitsubishi Chemical): liquid at room temperature (25° C.)
epoxy compound 2: jER630 (multifunctional epoxy resin of an aminophenol type, manufactured by Mitsubishi Chemical): liquid at room temperature (25° C.)
epoxy compound 3: TETRAD-X (multifunctional epoxy resin of an m-xylylenediamine type, manufactured by MITSUBISHI GAS CHEMICAL COMPANY, INC.): liquid at room temperature (25° C.)
epoxy compound 4: jER806 (epoxy resin of a bisphenol F type, manufactured by Mitsubishi Chemical): liquid at room temperature (25° C.)
epoxy compound 5: Epolight 1600 (1,6-hexanediol diglycidyl ether, manufactured by Kyoeisha Chemical Co., Ltd.): liquid at room temperature (25° C.)
amine 1: 5-amino-2-(p-aminophenyl)benzoxazole
amine 2: 6-amino-2-(m-aminophenyl)benzoxazole
amine 3: dicyandiamide
amine 4: m-phenylenediamine
amine 5: 4,4'-diaminodiphenylmethane
filler 1: AS-400 (roundish alumina, average particle size of 13 μm, manufactured by Showa Denko)
filler 2: CB-A50BC (spherical alumina, average particle size of 50 μm, manufactured by Showa Denko)
filler 3: AO-509 (spherical alumina, average particle size of 10 μm, manufactured by Admatechs Company Limited)
filler 4: AO-502 (spherical alumina, average particle size of 0.7 μm, manufactured by Admatechs Company Limited)
filler 5: SP-3 (flaky-shaped boron nitride, manufactured by Denka Company Limited)

TABLE 2

| Resin composition | | | Example 8 | Example 9 | Example 10 | Example 11 | Comparative Example 1 | Comparative Example 2 | Comparative Example 3 |
|---|---|---|---|---|---|---|---|---|---|
| | | | 8 | 9 | 10 | 11 | 12 | 13 | 14 |
| Compounding amount (parts(s) by mass) | epoxy compound (A) | epoxy compound 1 | 12 | 12 | 20 | | 12 | 10 | 10 |
| | | epoxy compound 2 | 3 | | | 10 | | 3 | 3 |
| | | epoxy compound 3 | | 3 | | | | | |
| | | epoxy compound 4 | | | | | | | |
| | | epoxy compound 5 | | | | 5 | | | |
| | amine curing agent (B) | amine 1 | 10 | 2 | 4 | 5 | | | |
| | | amine 2 | | | | | | | |
| | | amine 3 | | | | 3 | 5 | | |
| | | amine 4 | | | | | | 5 | |
| | | amine 5 | | | | | | | 5 |
| | thermally conductive filler (C) | filler 1 | 100 | 100 | 100 | | 100 | | |
| | | filler 2 | | | | 100 | | 100 | |
| | | filler 3 | | | | | | | 90 |
| | | filler 4 | | | | | | | 10 |
| | | filler 5 | | | | | | | |

TABLE 2-continued

| Resin composition | | Example 8 8 | Example 9 9 | Example 10 10 | Example 11 11 | Comparative Example 1 12 | Comparative Example 2 13 | Comparative Example 3 14 |
|---|---|---|---|---|---|---|---|---|
| Volume filling rate of thermally conductive filler (C) | (% by volume) | 57 | 66 | 58 | 59 | 66 | 65 | 65 |
| Content of multifunctional epoxy compound in epoxy compound (A) | (% by mass) | 20 | 20 | 0 | 67 | 0 | 23 | 23 |
| Viscosity | (Pa·s) | 43 | 54 | 78 | 28 | 32 | 42 | 40 |
| Thermal conductivity | (W/mK) | 6.5 | 6.8 | 5.4 | 6.3 | 2.2 | 2.6 | 2.8 |
| Adhesive strength | (MPa) | 9.0 | 7.0 | 8.3 | 8.1 | 7.4 | 7.1 | 7.3 | epoxy compound 1: jER828 (epoxy resin of a bisphenol A type, manufactured by Mitsubishi Chemical): liquid at room temperature (25° C.)
epoxy compound 2: jER630 (multifunctional epoxy resin of an aminophenol type, manufactured by Mitsubishi Chemical): liquid at room temperature (25° C.)
epoxy compound 3: TETRAD-X (multifunctional epoxy resin of an m-xylylenediamine type, manufactured by MITSUBISHI GAS CHEMICAL COMPANY, INC.): liquid at room temperature (25° C.)
epoxy compound 4: jER806 (epoxy resin of a bisphenol F type, manufactured by Mitsubishi Chemical): liquid at room temperature (25° C.)
epoxy compound 5: Epolight 1600 (1,6-hexanediol diglycidyl ether, manufactured by Kyoeisha Chemical Co., Ltd.): liquid at room temperature (25° C.)
amine 1: 5-amino-2-(p-aminophenyl)benzoxazole
amine 2: 6-amino-2-(m-aminophenyl)benzoxazole
amine 3: dicyandiamide
amine 4: m-phenylenediamine
amine 5: 4,4'-diaminodiphenylmethane
filler 1: AS-400 (roundish alumina, average particle size of 13 μm, manufactured by Showa Denko)
filler 2: CB-A50BC (spherical alumina, average particle size of 50 μm, manufactured by Showa Denko)
filler 3: AO-509 (spherical alumina, average particle size of 10 μm, manufactured by Admatechs Company Limited)
filler 4: AO-502 (spherical alumina, average particle size of 0.7 μm, manufactured by Admatechs Company Limited)
filler 5: SP-3 (flaky-shaped boron nitride, manufactured by Denka Company Limited)

Details of the raw materials in the tables are as follows.
<Epoxy Compound (A)>
Epoxy compound 1: jER (registered trademark) 828 (epoxy resin of a bisphenol A type, manufactured by Mitsubishi Chemical), a bifunctional epoxy compound, liquid at room temperature (25° C.)

Epoxy compound 2: iER (registered trademark) 630 (epoxy resin of an aminophenol type, manufactured by Mitsubishi Chemical), a trifunctional epoxy compound, liquid at room temperature (25° C.)

Epoxy compound 3: TETRAD (registered trademark)-X (tetra functional epoxy resin of an m-xylylenediamine type, manufactured by MITSUBISHI GAS CHEMICAL COMPANY, INC.), liquid at room temperature (25° C.)

Epoxy compound 4: jER (registered trademark) 806 (epoxy resin of a bisphenol F type, manufactured by Mitsubishi Chemical), a bifunctional epoxy compound, liquid at room temperature (25° C.)

Epoxy compound 5: Epolight (registered trademark) 1600 (1,6-hexanediol diglycidyl ether, manufactured by Kyoeisha Chemical Co., Ltd.), a bifunctional epoxy compound, liquid at room temperature (25° C.)
<Amine Curing Agent (B)>
Amine 1: 5-amino-2-(p-aminophenyl)benzoxazole
Amine 2: 6-amino-2-(m-aminophenyl)benzoxazole
Amine 3: dicyandiamide
Amine 4: m-phenylenediamine
Amine 5: 4,4'-diaminodiphenylmethane
<Thermally Conductive Filler (C)>
Filler 1: AS-400 (roundish alumina, average particle size of 13 μm, manufactured by Showa Denko)
Filler 2: CB-A50BC (spherical alumina, average particle size of 50 μm, manufactured by Showa Denko)
Filler 3: AO-509 (spherical alumina, average particle size of 10 μm, manufactured by Admatechs Company Limited)
Filler 4: AO-502 (spherical alumina, average particle size of 0.7 μm, manufactured by Admatechs Company Limited)
Filler 5: SP-3 (flaky-shaped boron nitride, manufactured by Denka Company Limited)

As will be noted from the result of Table 1 and Table 2, the cured products of Examples 1 to 11 using the amine curing agent containing the curing agent having a benzoxazole skeleton achieved both of excellent thermal conductivity and excellent adhesive strength as compared with the cured products of Comparative Examples 1 to 3.

The invention claimed is:

1. A thermally conductive resin composition containing an epoxy compound (A), an amine curing agent (B) and a thermally conductive filler (C),
   wherein the epoxy compound (A) is in a liquid form,
   wherein the amine curing agent (B) contains a benzoxazole skeleton, and
   wherein the amine curing agent (B) comprises an amine curing agent having a long diameter and a short diameter, wherein the long diameter is from 100 μm to 1000 μm.

2. A thermally conductive resin composition according to claim 1, wherein a content of the thermally conductive filler (C) is from 40% by volume to 75% by volume in relation to the whole volume of the resin composition.

3. The thermally conductive resin composition according to claim 1, wherein a viscosity of the composition measured at 25° C. and 5 rpm is from 10 Pa·s to 300 Pa·s.

4. The thermally conductive resin composition according to claim 1, wherein the amine curing agent (B) is 5-amino-2-(p-aminophenyl)benzoxazole.

5. The thermally conductive resin composition according to claim 1, wherein the thermally conductive filler (C) is at least one substance selected from a group consisting of alumina, magnesium oxide, zinc oxide, boron nitride, aluminum nitride, silicon nitride, barium titanate, silicon carbide, carbon, diamond, silver, gold, copper, nickel and aluminum.

6. The thermally conductive resin composition according to claim 1, wherein the thermally conductive filler (C) is spherical.

7. The thermally conductive resin composition according to claim 1, wherein the composition contains, as the epoxy compound (A), 10% by weight or more of an epoxy compound having three or more functionalities in relation to the whole weight of the epoxy compound (A).

8. The thermally conductive resin composition according to claim 1, wherein a ratio by mass of the epoxy compound (A) to the amine curing agent (B) is from 90/10 to 60/40 in terms of (A)/(B).

9. The thermally conductive resin composition according to claim 1, wherein the composition does not contain any compound having a boiling point of 200° C. or lower.

10. A thermally conductive adhesive comprising the thermally conductive resin composition according to claim 1.

11. An electronic part comprising the thermally conductive resin composition according to claim 1.

* * * * *